(12) United States Patent
Katoh et al.

(10) Patent No.: US 11,620,530 B2
(45) Date of Patent: Apr. 4, 2023

(54) LEARNING METHOD, AND LEARNING APPARATUS, AND RECORDING MEDIUM

(71) Applicant: FUJITSU LIMITED, Kawasaki (JP)

(72) Inventors: Takashi Katoh, Kawasaki (JP); Kento Uemura, Kawasaki (JP); Suguru Yasutomi, Kawasaki (JP); Takeshi Osoekawa, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 435 days.

(21) Appl. No.: 16/741,860

(22) Filed: Jan. 14, 2020

(65) Prior Publication Data

US 2020/0234140 A1 Jul. 23, 2020

(30) Foreign Application Priority Data

Jan. 17, 2019 (JP) .............................. JP2019-006422

(51) Int. Cl.
| | | |
|---|---|---|
| *G06N 3/08* | (2006.01) | |
| *G06N 20/20* | (2019.01) | |
| *G06N 3/04* | (2006.01) | |
| *G06N 3/084* | (2023.01) | |

(52) U.S. Cl.
CPC ........... *G06N 3/084* (2013.01); *G06N 3/0454* (2013.01); *G06N 20/20* (2019.01)

(58) Field of Classification Search
CPC ....... G06N 3/084; G06N 3/0454; G06N 20/20
See application file for complete search history.

(56) References Cited

U.S. PATENT DOCUMENTS

| | | | |
|---|---|---|---|
| 10,388,272 B1* | 8/2019 | Thomson | G10L 15/22 |
| 10,803,357 B2* | 10/2020 | Yasutomi | G06V 10/22 |
| 10,891,516 B2* | 1/2021 | Endoh | G06V 10/40 |
| 11,100,678 B2* | 8/2021 | Yasutomi | G06T 9/002 |
| 2015/0120626 A1 | 4/2015 | Gupta et al. | |
| 2018/0012124 A1 | 1/2018 | Hara et al. | |
| 2018/0130355 A1 | 5/2018 | Zia et al. | |
| 2018/0144214 A1* | 5/2018 | Hsieh | G06T 7/0002 |
| 2018/0157934 A1* | 6/2018 | Hu | G06K 9/6262 |
| 2018/0253865 A1* | 9/2018 | Price | G06T 7/11 |
| 2018/0260793 A1* | 9/2018 | Li | G06N 7/005 |

(Continued)

FOREIGN PATENT DOCUMENTS

GB  2560219  9/2018

OTHER PUBLICATIONS

Khan, Adil, and Khadija Fraz. "Post-training iterative hierarchical data augmentation for deep networks." Advances in Neural Information Processing Systems 33 (2020): 689-699. (Year: 2020).*

(Continued)

*Primary Examiner* — Andrae S Allison
(74) *Attorney, Agent, or Firm* — Fujitsu Patent Center

(57) ABSTRACT

A learning method executed by a computer, the learning method includes: learning parameters of a machine learning model having intermediate feature values by inputting a plurality of augmented training data, which is generated by augmenting original training data, to the machine learning model so that specific intermediate feature values, which are calculated from specific augmented training data augmented from a same original training data, become similar to each other.

6 Claims, 23 Drawing Sheets

(56) References Cited

U.S. PATENT DOCUMENTS

| | | |
|---|---|---|
| 2018/0315182 A1 | 11/2018 | Rapaka et al. |
| 2019/0122120 A1 | 4/2019 | Wu et al. |
| 2019/0130278 A1* | 5/2019 | Karras .................. G06N 3/0472 |
| 2019/0171936 A1* | 6/2019 | Karras .................. G06N 3/084 |
| 2019/0318260 A1 | 10/2019 | Yasutomi et al. |
| 2020/0175961 A1* | 6/2020 | Thomson ................ G10L 15/28 |
| 2020/0234139 A1 | 7/2020 | Katoh et al. |
| 2021/0117868 A1* | 4/2021 | Sriharsha .......... G06F 16/24568 |

OTHER PUBLICATIONS

Luis P, Jason W. The effectiveness of data augmentation in image classification using deep learning. In: Stanford University research report, 2017. (Year: 2017).*

Utako Yamamoto et al., "Deformation estimation of an elastic object by partial observation using a neural network", pp. 1-12, Nov. 2017.

Tolga Tasdizen et al., "Appearance invariance in convolutional networks with neighborhood similarity", pp. 1-12, Jul. 2017.

Grigorios G. Chrysos et al., "Visual Data Augmentation through Learning", 9 pages, Jan. 2018.

Baruch Epstein et al., "Joint auto-encoders: a flexible multi-task learning framework", pp. 1-11, May 2017.

Weihua Hu et al., "Learning Discrete Representations via Information Maximizing Self-Augmented Training", 15 pages, Jun. 2017.

Matthias Meyer et al., "Unsupervised Feature Learning for Audio Analysis", Workshop track—ICLR 2017, pp. 1-4, Dec. 2017.

Xinyue Zhu et al., "Emotion Classification with Data Augmentation Using Generative Adversarial Networks", 14 pages, Dec. 2017.

Yu Su, et al., "Cross-domain Semantic Parsing via Paraphrasing", 12 pages, Jul. 2017.

EESR—Extended European Search Report dated Jun. 16, 2020 for European Patent Application No. 20151397.5.

USPTO—Non-Final Rejection dated Jun. 8, 2022 for related U.S. Appl. No. 16/741,839 [pending].

USPTO—Office Action of U.S. Appl. No. 16/741,839 dated Nov. 17, 2022 [pending].

EPOA—Office Action of European Patent Application No. 20151397.5, dated Feb. 1, 2023. ** Documents discussed in the EPOA were previously submitted in the IDS.

* cited by examiner

FIG. 4

| TRAINING DATA | CORRECT LABEL |
|---|---|
| x1 | y1 |
| x2 | y2 |
| x3 | y3 |
| ... | ... |

| AUGMENTED TRAINING DATA | CORRECT LABEL |
|---|---|
| x1.1, x1.2, x1.3 | y1 |
| x2.1, x2.2, x2.3 | y2 |
| x3.1, x3.2, x3.3 | y3 |
| ... | ... |

| IDENTIFICATION INFORMATION | PARAMETER |
|---|---|
| FIRST NN | θ1 |
| SECOND NN | θ2 |

| DATA NUMBER | TRAINING DATA | CORRECT LABEL |
|---|---|---|
| 001 | x1 | y1 |
| 002 | x2 | y2 |
| 003 | x3 | y3 |
| ... | ... | ... |

| DATA NUMBER | AUGMENTED TRAINING DATA | CORRECT LABEL |
|---|---|---|
| 001 | x1.1, x1.2, x1.3 | y1 |
| 002 | x2.1, x2.2, x2.3 | y2 |
| 003 | x3.1, x3.2, x3.3 | y3 |
| ... | ... | ... |

| DATA NUMBER | REFERENCE FEATURE VALUE |
|---|---|
| 001 | z1 |
| 002 | z2 |
| 003 | z3 |
| ... | ... |

240d

LEARNING METHOD, AND LEARNING APPARATUS, AND RECORDING MEDIUM

CROSS-REFERENCE TO RELATED APPLICATION

This application is based upon and claims the benefit of priority of the prior Japanese Patent Application No. 2019-6422, filed on Jan. 17, 2019, the entire contents of which are incorporated herein by reference.

FIELD

The embodiments discussed here are related to a learning technique.

BACKGROUND

It is preferable to use a large amount of training data (learning data) to learn a deep machine learning model. If the training data is insufficient, and a type of application data not included in the training data is applied to the deep machine learning model learned based on the training data, an appropriate output result may not be obtained, and it is likely that the learning will fail. For example, if data with noise is not included in the training data, and data with noise is included in the application data, it is difficult to apply the application data to the deep machine learning model.

FIG. 20 is a diagram for describing a relationship between training data and application data. When a range of a type of training data 10A includes a range of a type of application data 11A, an appropriate output result may be obtained by applying the application data 11A to a deep machine learning model learned based on the training data 10A. Hereinafter, the range of a type of data will be simply referred to as a range.

On the other hand, when a range of training data 10B does not include part of a range of application data 11B, an appropriate output result may not be obtained by applying the application data 11B to a deep machine learning model learned based on the training data 10B. For example, if the application data 11B is applied to the deep machine learning model, it is likely that the learning will fail.

Examples of a technique for solving the problem include normalization and data augmentation. FIG. 21 is a diagram for describing normalization and data augmentation. In the example illustrated in FIG. 21, training data 10C is insufficient, and the entire range of application data 11C is not included in the range of the training data 10C.

In a related art, common processing (normalization), such as noise removal, centering, and interpolation, is applied to the training data 10C and the application data 11C to put the range of the application data 11C into the range of the training data 10C.

In a related art, processing (data augmentation), such as noise addition, translation, and insertion of missing data, is applied to the training data 10C to extend the range of the training data 10C to the range of the application data 11C. In this way, the range of the application data 11C is put into the range of the training data 10C.

As described in FIG. 21, the normalization or the data augmentation is performed, and the range of the training data 10C includes the entire range of the application data 11C. Therefore, the application data 11C may be applied to the deep machine learning model learned based on the training data 10C.

A related technique is disclosed in, for example, Utako Yamamoto et al. "Deformation estimation of an elastic object by partial observation using a neural network."

SUMMARY

According to an aspect of the embodiments, a learning method includes: learning parameters of a machine learning model having intermediate feature values by inputting a plurality of augmented training data, which is generated by augmenting original training data, to the machine learning model so that specific intermediate feature values, which are calculated from specific augmented training data augmented from a same original training data, become similar to each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts an example of a data structure of a learning data table according to the first embodiment;

FIG. 5 depicts an example of a data structure of an augmented training data table according to the first embodiment;

FIG. 6 depicts an example of a data structure of a parameter table according to the first embodiment;

FIG. 13 depicts an example of a data structure of a learning data table according to the second embodiment;

FIG. 14 depicts an example of a data structure of an augmented training data table according to the second embodiment;

FIG. 15 depicts an example of a data structure of a reference feature value table according to the second embodiment;

DESCRIPTION OF EMBODIMENTS

An advantage of the normalization is that part of inputs of the same label with originally different features is input as the same feature values to a learning device through the normalization reflecting the knowledge of the user. Therefore, the labels may be easily separated at intermediate feature values, and accurate learning may be performed.

Figure 22:
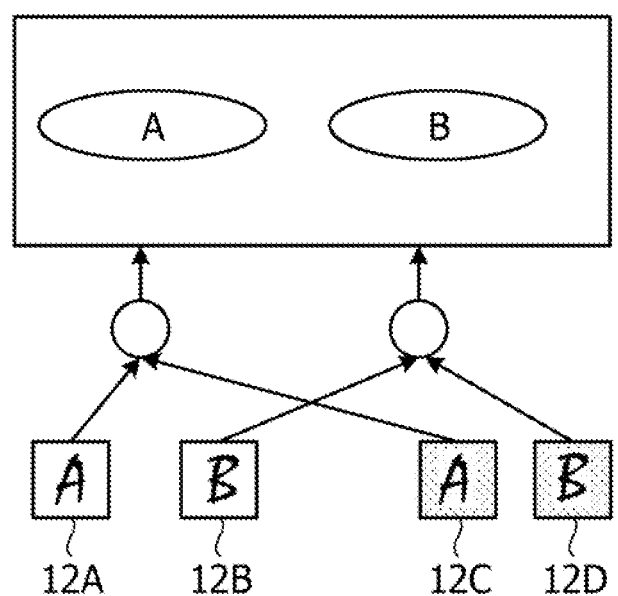
FIG. 22 is a diagram for describing intermediate feature values when normalized training data is input to a learning device.

FIG. 22 is a diagram for describing intermediate feature values when the normalized training data is input to a learning device. Data 12A, 12B, 12C, and 12D will be used as the normalized training data to describe the intermediate feature values. The data 12A and the data 12C are data of the same label with originally different features. The feature values of the data 12A and the data 12C become the same as a result of the normalization. When the data 12A and 12C are input to a learning device 20, the intermediate feature values of the data 12A and 12C are included in a region (distribution) A.

The data 128 and the data 120 are data of the same label with originally different features. The feature values of the data 128 and the data 12D become the same as a result of the normalization. When the data 128 and 120 are input to the learning device 20, the intermediate feature values of the data 12B and 120 are included in a region (distribution) B.

As illustrated in FIG. 22, the distribution A of the intermediate feature values of the data 12A and 12C and the distribution B of the intermediate feature values of the data 12B and 12D are separated, and accurate learning may be performed. However, the normalization has a problem that the degree of difficulty of data processing is high, and it is difficult to perform the normalization to prepare the training data sufficient for learning the deep machine learning model.

The data augmentation has an advantage that the data processing is easier than in the normalization. However, it is difficult to create all input patterns even when the data augmentation is used. Furthermore, if incomplete data augmentation is performed, it is difficult to separate the labels at the intermediate feature values compared to the normalized data, and the learning accuracy is degraded.

Figure 23:
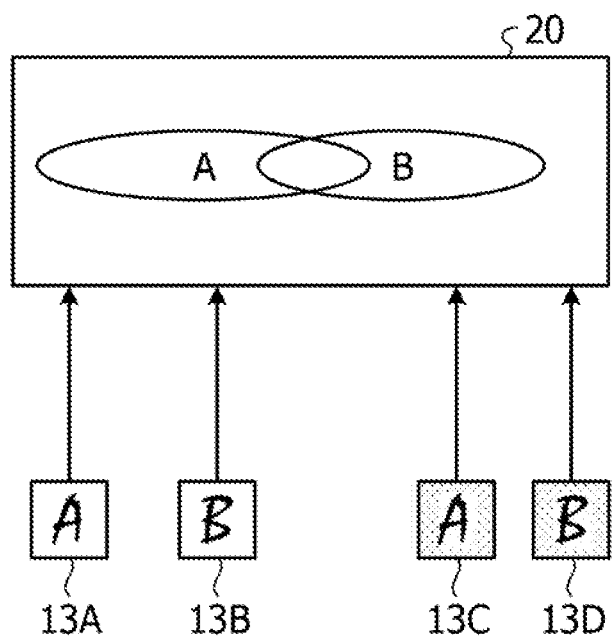
FIG. 23 is a diagram for describing intermediate feature values when augmented training data is input to a learning device.

FIG. 23 is a diagram for describing intermediate feature values when augmented training data is input to a learning device. Data 13A, 138, 13C, and 13D will be used to describe the augmented training data. The data 13A and the data 13C are data of the same label with different features. When the data 13A and 13C are input to the learning device 20, the intermediate feature values of the data 13A and 13C are included in the region (distribution) A.

The data 13B and the data 13D are data of the same label with different features. When the data 13B and 13D are input to the learning device 20, the intermediate feature values of the data 13B and 13D are included in the region (distribution) B.

As illustrated in FIG. 23, the distribution A of the intermediate feature values of the data 13A and 13C and the distribution B of the intermediate feature values of the data 13B and 13D may partially overlap. Therefore, the labels are not clearly separated, and the learning accuracy is degraded.

Embodiments of a learning method, a learning program, and a learning apparatus disclosed in the present specification will, now be described in detail with reference to the drawings. Note that the technique is not limited to the embodiments.

Figure 1:
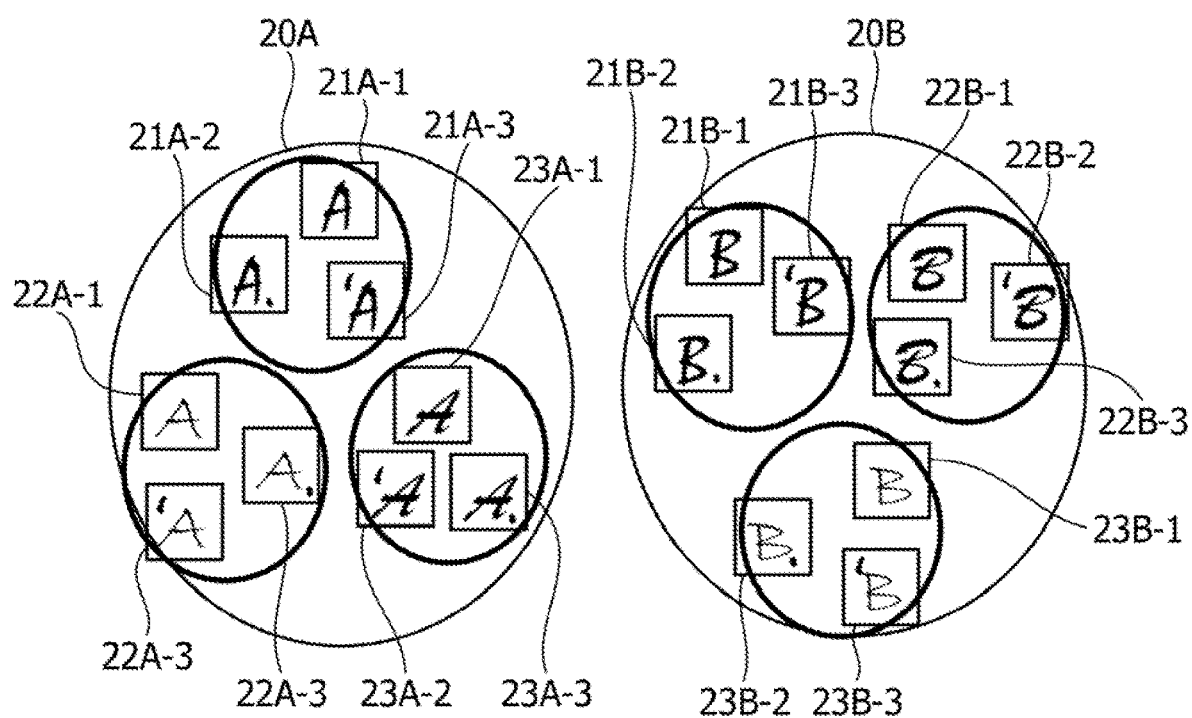
FIG. 1 is a diagram for description regarding data augmentation according to a first embodiment.

FIG. 1 is a diagram for description regarding data augmentation according to a first embodiment. In the example illustrated in FIG. 1, a training data group 20A includes training data 21A-1 to 21A-3, training data 22A-1 to 22A-3, and training data 23A-1 to 23A-3. The training data group 20A is associated with, for example, a correct label "A."

The training data 21A-2 and 21A-3 are data obtained by augmenting the original training data 21A-1. The training data 22A-2 and 22A-3 are data obtained by augmenting the original training data 22A-1. The training data 23A-2 and 23A-3 are data obtained by augmenting the original training data 23A-1.

A training data group 20B includes training data 21B-1 to 21B-3, training data 22B-1 to 22B-3, and training data 23B-1 to 23B-3. The training data group 208 is associated with, for example, a correct label "B."

The training data 218-2 and 21B-3 are data obtained by augmenting the original training data 218-1. The training data 22B-2 and 228-3 are data obtained by augmenting the original training data 228-1. The training data 23B-2 and 23B-3 are data obtained by augmenting the original training data 23B-1.

When a learning apparatus according to the first embodiment inputs the training data to a neural network (NN) or the like to perform learning, the learning apparatus learns parameters by setting a restriction so that the intermediate feature values of the training data generated from the same original training data become similar to each other. Note that the learning apparatus may learn the parameters so that the intermediate feature values of the original training data and the intermediate feature values of the training data generated from the original training data become similar to each other.

For example, when the learning apparatus inputs the training data 21A-1 to 21A-3 to a learning device to perform deep learning, the learning apparatus learns the parameters of the NN by setting a restriction so that the intermediate feature values of the training data 21A-1 to 21A-3 become similar to each other. The learning apparatus also learns the parameters of the NN so that output labels when the training data 21A-1 to 21A-3 are input to the learning device approach the correct label "A." This also applies to the training data 22A-1 to 22A-3 and 23A-1 to 23A-3.

When the learning apparatus inputs the training data 21B-1 to 21B-3 to the learning device to perform deep learning, the learning apparatus learns the parameters of the NN by setting a restriction so that the intermediate feature values of the training data 21B-1 to 21B-3 become similar to each other. The learning apparatus also learns the parameters of the NN so that the output labels when the training data 21B-1 to 21B-3 are input to the learning device approach the correct label "B." This also applies to the training data 22B-1 to 22B-3 and 23B-1 to 23B-3.

Figure 2:
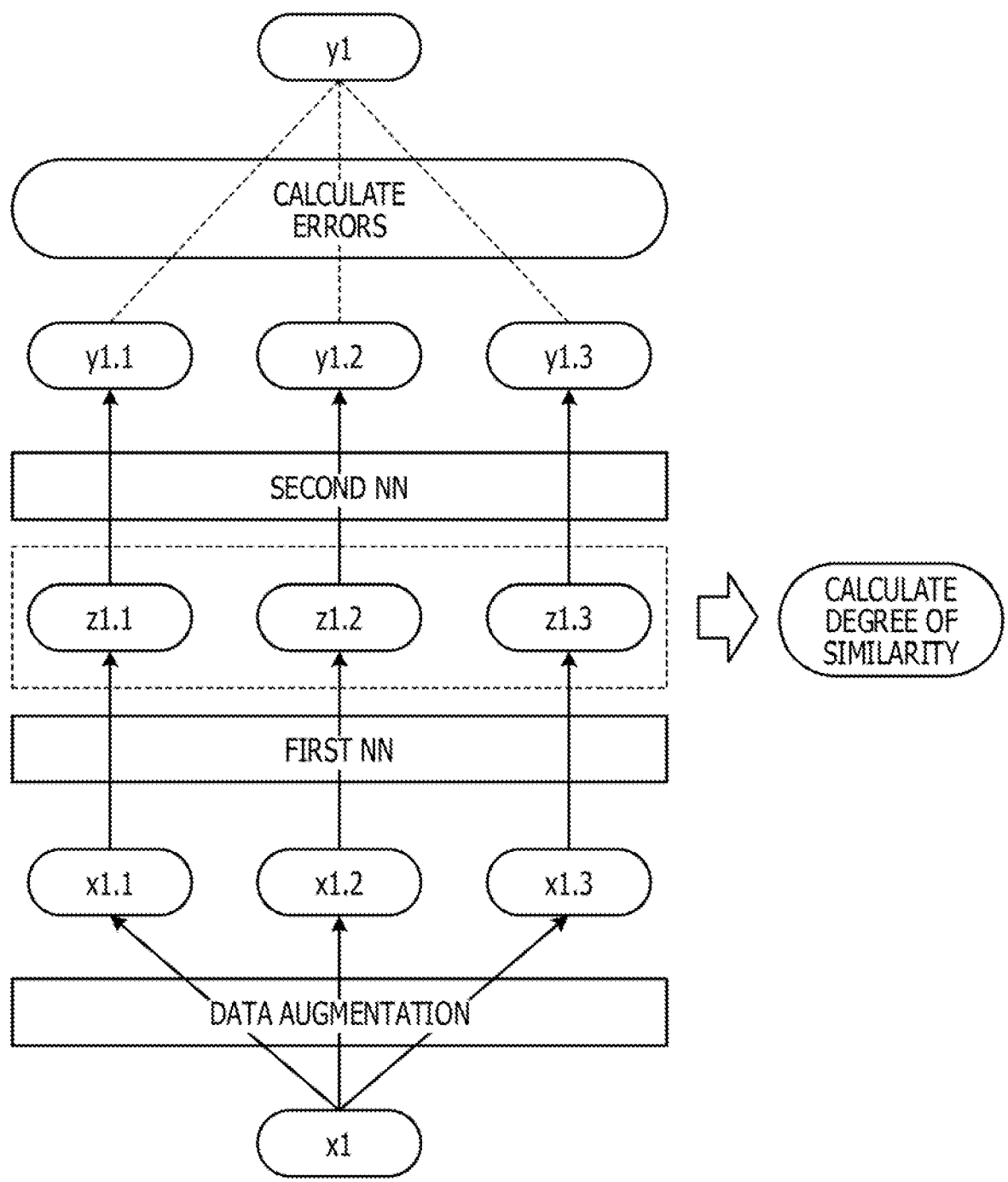
FIG. 2 is a diagram for describing a process of a learning apparatus according to a first embodiment.

FIG. 2 is a diagram for describing a process of a learning apparatus according to the first embodiment. As illustrated in FIG. 2, the learning apparatus augments original training data x1 to generate a plurality of training data x1.1, x1.2, and x1.3. A correct label for the training data x1 will be referred to as y1.

The learning apparatus inputs the plurality of training data x1.1, x1.2, and x1.3 to a first NN to calculate intermediate feature values z1.1, z1.2, and z1.3. The first NN is an example of a "lower layer." The learning apparatus inputs the intermediate feature values z1.1, z1.2, and z1.3 to a second NN to calculate output labels y1.1, y1.2, and y1.3.

The learning apparatus uses a back propagation method to learn parameters of the first NN to increase a degree of similarity of the intermediate feature values z1.1, z1.2, and z1.3. The learning apparatus also calculates errors between the output labels y1.1, y1.2, and y1.3 and the correct label y1 and uses the back propagation method to learn parameters of the first NN and the second NN to reduce the errors.

According to the learning apparatus of the first embodiment, the back propagation method is used to learn the parameters of the first NN to increase the degree of similarity of the intermediate feature values z1.1, z1.2, and z1.3. As a result, the intermediate feature values of the plurality of training data augmented from the same training data become close to each other. Therefore, the data may be easily separated for each label, and the accuracy of the deep learning using the data augmentation may be improved.

Figure 3:
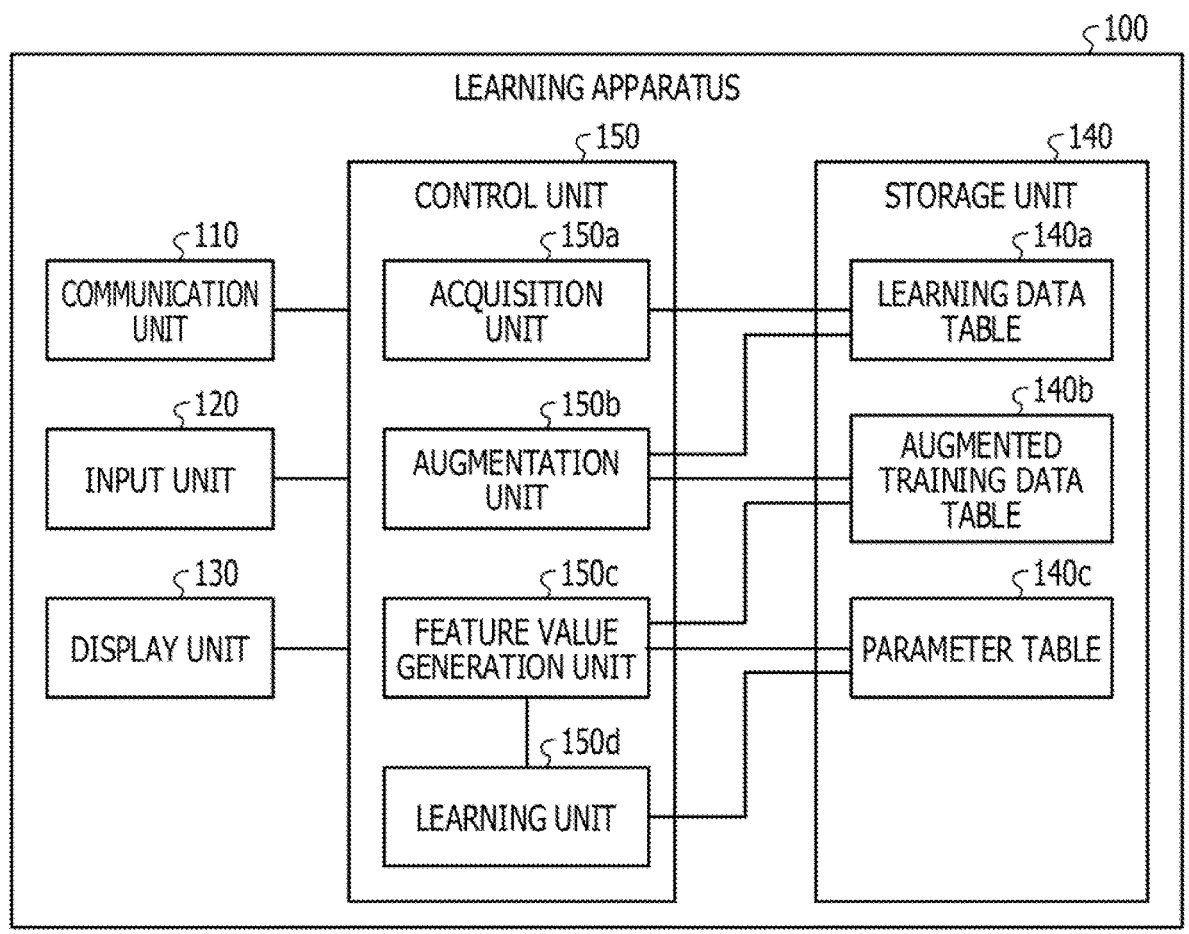
FIG. 3 is a functional block diagram illustrating a configuration of a learning apparatus according to the first embodiment.

Next, an example of a configuration of the learning apparatus according to the first embodiment will be described. FIG. 3 is a functional block diagram illustrating a configuration of a learning apparatus according to the first embodiment. As illustrated in FIG. 3, a learning apparatus 100 includes a communication unit 110, an input unit 120, a display unit 130, a storage unit 140, and a control unit 150.

The communication unit 110 is a processing unit that executes data communication with an external apparatus (not illustrated) through a network or the like. The communication unit 110 corresponds to a communication apparatus. For example, the communication unit 110 receives information of a learning data table 140*a* described later from the external apparatus or the like.

The input unit 120 is an input apparatus for inputting various types of information to the learning apparatus 100. For example, the input unit 120 corresponds to a keyboard, a mouse, a touch panel, or the like.

The display unit 130 is a display apparatus that displays various types of information output from the control unit 150. For example, the display unit 130 corresponds to a liquid crystal display, a touch panel, or the like.

The storage unit 140 includes the learning data table 140*a*, an augmented training data table 140*b*, and a parameter table 140*c*. The storage unit 140 corresponds to a semiconductor memory device, such as a random access memory (RAM), a read only memory (ROM), and a flash memory, or a storage apparatus, such as a hard disk drive (HDD).

The learning data table 140*a* is a table holding the original training data. FIG. 4 depicts an example of a data structure of a learning data table according to the first embodiment. As illustrated in FIG. 4, the training data and the correct labels are associated in the learning data table 140*a*. For example, the correct label corresponding to the training data "x1" is "y1."

The augmented training data table 140*b* is a table holding the training data augmented based on the original training data. FIG. 5 depicts an example of a data structure of an augmented training data table according to the first embodiment. As illustrated in FIG. 5, the augmented training data and the correct labels are associated in the augmented training data table. The correct label corresponding to the augmented training data is a correct label associated with the training data as a generation source of the augmented training data.

For example, it is assumed that the original training data is training dab "x1," and the correct label of the training data "x1" is "y1," Assuming that the training data augmented based on the training data "x1" is training data "x1.1, x1.2, x1.3," the correct label corresponding to the training data "x1.1, x1.2, x1.3" is "y1."

The parameter table 140*c* is a table holding the parameters of the first NN and the parameters of the second NN. FIG. 6 depicts an example of a data structure of a parameter table according to the first embodiment. As illustrated in FIG. 6, identification information and the parameters are associated in the parameter table 140*c*. The identification information is information for identifying each NN. The parameters are parameters set for each NN. The NN includes a plurality of layers, and each layer includes a plurality of nodes. The nodes are linked by edges. Each layer has a function called an active function and a bias value, and the edge has a weight. In the first embodiment, the bias values, the weights, and the like set for the NN will be collectively referred to as "parameters."

FIG. 3 will be described again. The control unit 150 includes an acquisition unit 150*a*, an augmentation unit 150*b*, a feature value generation unit 150*c*, and a learning unit 150*d*. The control unit 150 may be realized by a central processing unit (CPU), a micro processing unit (MPU), or the like. The control unit 150 may also be realized by hard-wired logic, such as an application specific integrated circuit (ASIC) and a field programmable gate array (FPGA).

The acquisition unit 150*a* is a processing unit that acquires information of the learning data table 140*a* from an external apparatus or the like. The acquisition unit 150*a* stores the acquired information of the learning data table 140*a* in the learning data table 140*a*.

The augmentation unit 150*b* is a processing unit that augments (performs data augmentation of) the original training data stored in the learning data table 140*a* to generate a plurality of training data. For example, the data augmentation performed by the augmentation unit 150*b* corresponds to processing, such as noise addition, translation, and insertion of missing data, applied to the training data. In the example illustrated in FIG. 1, the augmentation unit 150*b* augments the training data 21A-1 to generate the training data 21A-2 and 21A-3.

The augmentation unit 150*b* associates and stores the augmented training data and the correct label for the original training data in the augmented training data table 140*b*. The augmentation unit 150*b* repeatedly applies the process to each training data stored in the learning data table 140*a*.

The feature value generation unit 150*c* is a processing unit that generates intermediate feature values corresponding to the plurality of training data augmented based on the same training data and that evaluates each intermediate feature value. The process of the feature value generation unit 150*c* will be described below.

The feature value generation unit 150*c* executes the first NN and sets the parameters of the first NN to parameters 81 stored in the parameter table 140*c*. The feature value generation unit 150*c* acquires the plurality of training data augmented based on the same training data from the augmented training data table 140*b* and sequentially inputs the plurality of acquired training data to the first NN. The feature value generation unit 150*c* uses the parameters 81 set for the first NN to calculate the intermediate feature values of the plurality of training data.

The feature value generation unit 150c outputs, to the learning unit 150d, the intermediate feature values corresponding to the plurality of training data augmented based on the same training data and the correct label associated with the plurality of training data.

The feature value generation unit 150c evaluates the degree of similarity of the intermediate feature values corresponding to the plurality of training data augmented based on the same training data. For example, the feature value generation unit 150c calculates variance of the intermediate feature values.

Figure 7:
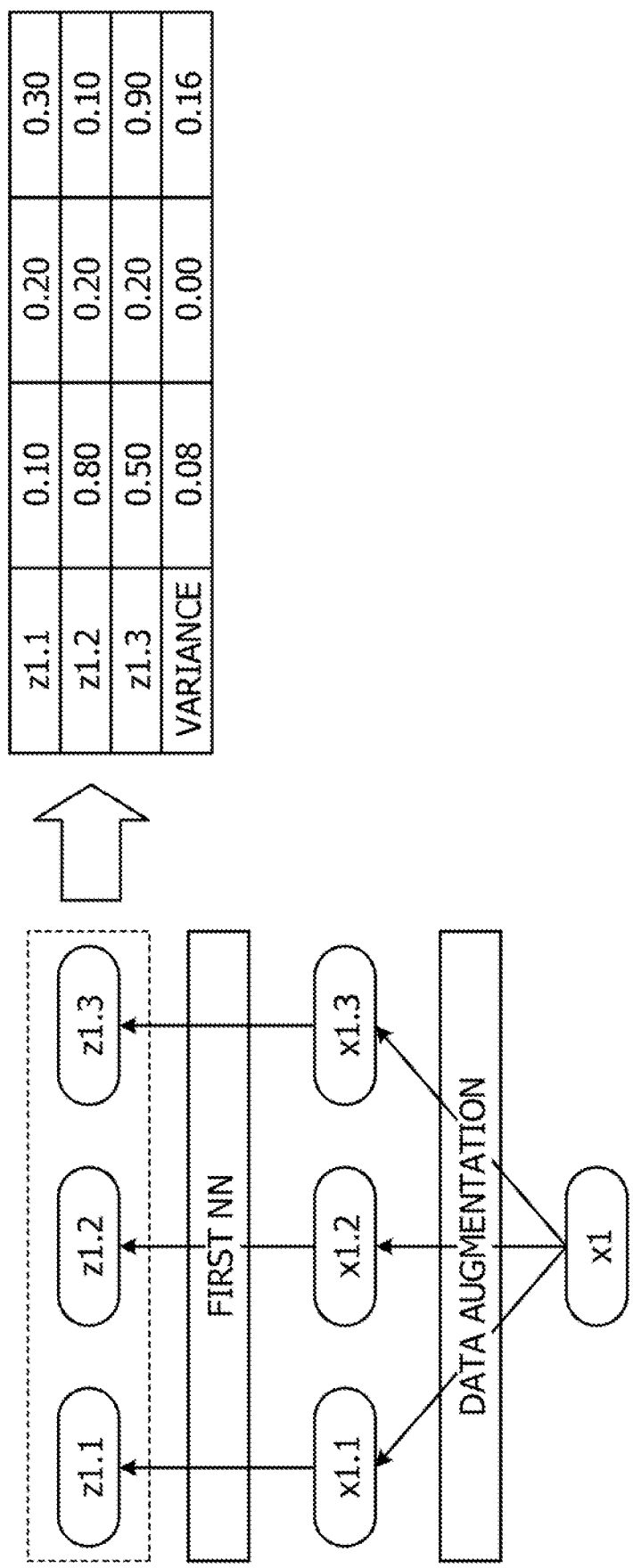
FIG. 7 is a diagram for describing a process of evaluating a degree of similarity of intermediate feature values according to the first embodiment.

FIG. 7 is a diagram for describing a process of evaluating a degree of similarity of intermediate feature values according to the first embodiment. In the example of FIG. 7, the dimension of the intermediate feature values is three-dimensional. The training data x1.1, x1.2, and x1.3 are data augmented from the original training data x1. The feature value generation unit 150c inputs the training data x1.1 to the first NN to calculate the intermediate feature values z1.1. The feature value generation unit 150c inputs the training data x1.2 to the first NN to calculate the intermediate feature values z1.2. The feature value generation unit 150c inputs the training data x1.3 to the first NN to calculate the intermediate feature values z1.3.

The values of the intermediate feature values z1.1 are "0.10, 0.20, 0.30." The values of the intermediate feature values z1.2 are "0.80, 0.20, 0.10." The values of the intermediate feature values z1.3 are "0.50, 0.20, 0.16." The feature value generation unit 150c calculates variance of each dimension, and the variance of each dimension is "0.08, 0.00, 0.16." The feature value generation unit 150c adds the variance of each dimension to obtain a value "0.24" and sets the value as an evaluation value. The higher the degree of similarity of the intermediate feature values, the lower the value of the variance. The feature value generation unit 150c outputs the information of the variance to the learning unit 150d.

The feature value generation unit 150c repeatedly executes the process for each set of the plurality of training data augmented based on the same training data.

FIG. 3 will be further described. The learning unit 150d is a processing unit that learns the parameters of the first NN and the second NN. The process of the learning unit 150d will be described below. The learning unit 150d executes the first NN and sets the parameters of the first NN to the parameters θ1 stored in the parameter table 140c. The learning unit 150d executes the second NN and sets the parameters of the second NN to parameters θ2 stored in the parameter table 140c.

The learning unit 150d sequentially inputs the intermediate feature values acquired from the feature value generation unit 150c to the second NN. The learning unit 150d uses the parameters θ2 set for the second NN to calculate a plurality of output labels.

Figure 8:
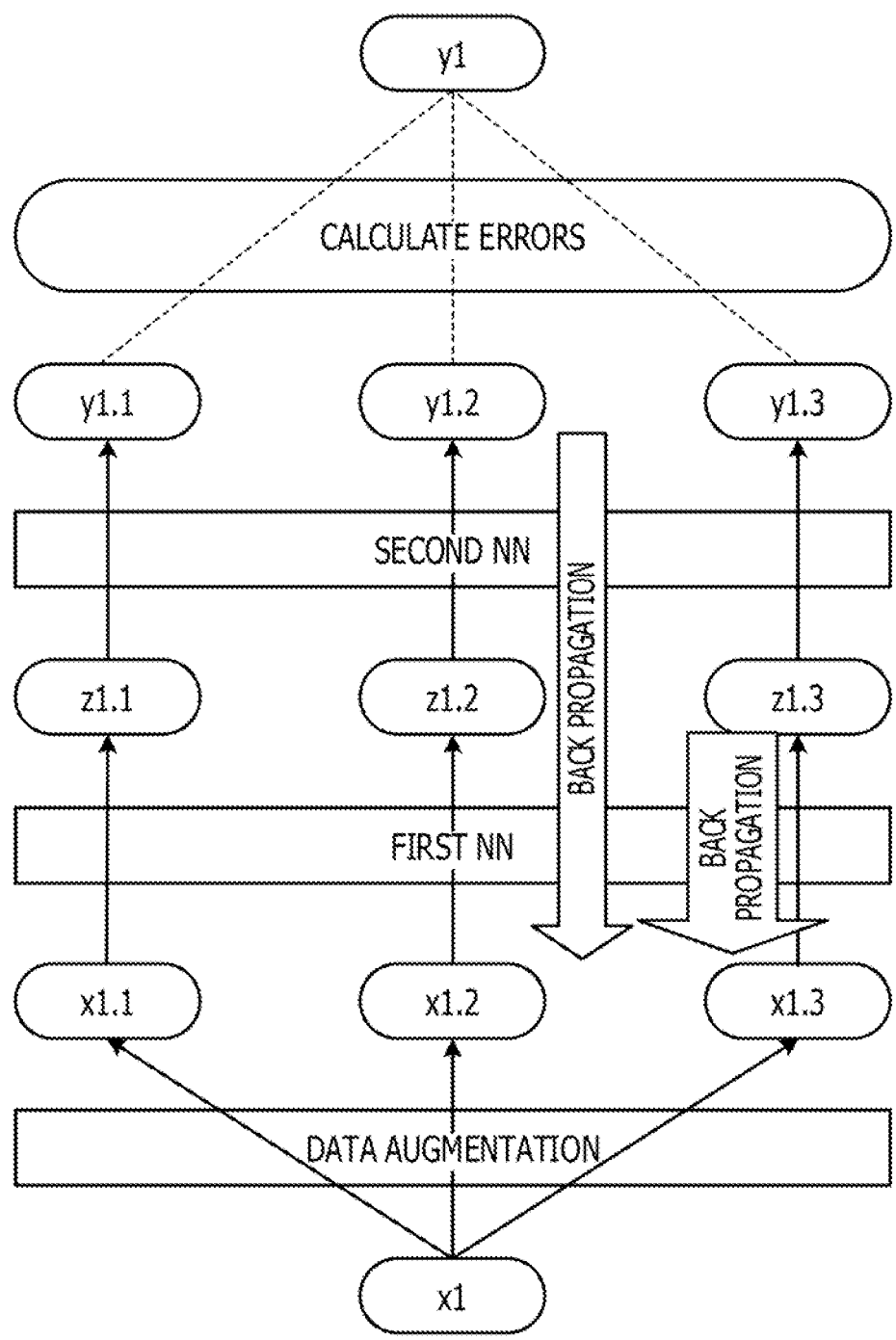
FIG. 8 is a diagram for describing a process of a learning unit according to the first embodiment.

FIG. 8 is a diagram for describing a process of a learning unit according to the first embodiment. For example, the learning unit 150d inputs the intermediate feature values z1.1 to the second NN and calculates the output label y1.1. The learning unit 150d learns the parameters θ1 of the first NN and the parameters θ2 of the second NN based on a back propagation method so that the output label y1.1 and the correct label y1 approach each other.

The learning unit 150d inputs the intermediate feature values z1.2 to the second NN and calculates the output label y1.2. The learning unit 150d learns the parameters θ1 of the first NN and the parameters θ2 of the second NN based on the back propagation method so that the output label y1.2 and the correct label y1 approach each other. The learning unit 150d inputs the intermediate feature values z1.3 to the second NN and calculates the output label y1.3. The learning unit 150d learns the parameters θ1 of the first NN and the parameters θ2 of the second NN based on the back propagation method so that the output label y1.3 and the correct label y1 approach each other. The learning unit 150d updates the parameters θ1 and θ2 of the parameter table 140c to the learned parameters θ1 and θ2.

The learning unit 150d repeatedly executes the process every time the learning unit 150d acquires a set of a plurality of intermediate feature values and a correct label.

When the learning unit 150d acquires the information of the variance from the feature value generation unit 150c, the learning unit 150d uses the back propagation method to learn the parameters θ1 of the first NN to reduce the value of the variance (increase the degree of similarity) when the training data x1.1, x1.2, and x1.3 are input to the first NN. The feature value generation unit 150c updates the parameters θ1 of the parameter table 140c to the learned parameters θ1 of the first NN. The learning unit 150d repeatedly executes the process every time the learning unit 150d acquires the information of the variance.

For example, the learning unit 150d learns the parameters θ1 and θ2 of the first NN and the second NN to reduce the errors between the output labels and the correct label and to increase the degree of similarity of the intermediate feature values.

Figure 9:
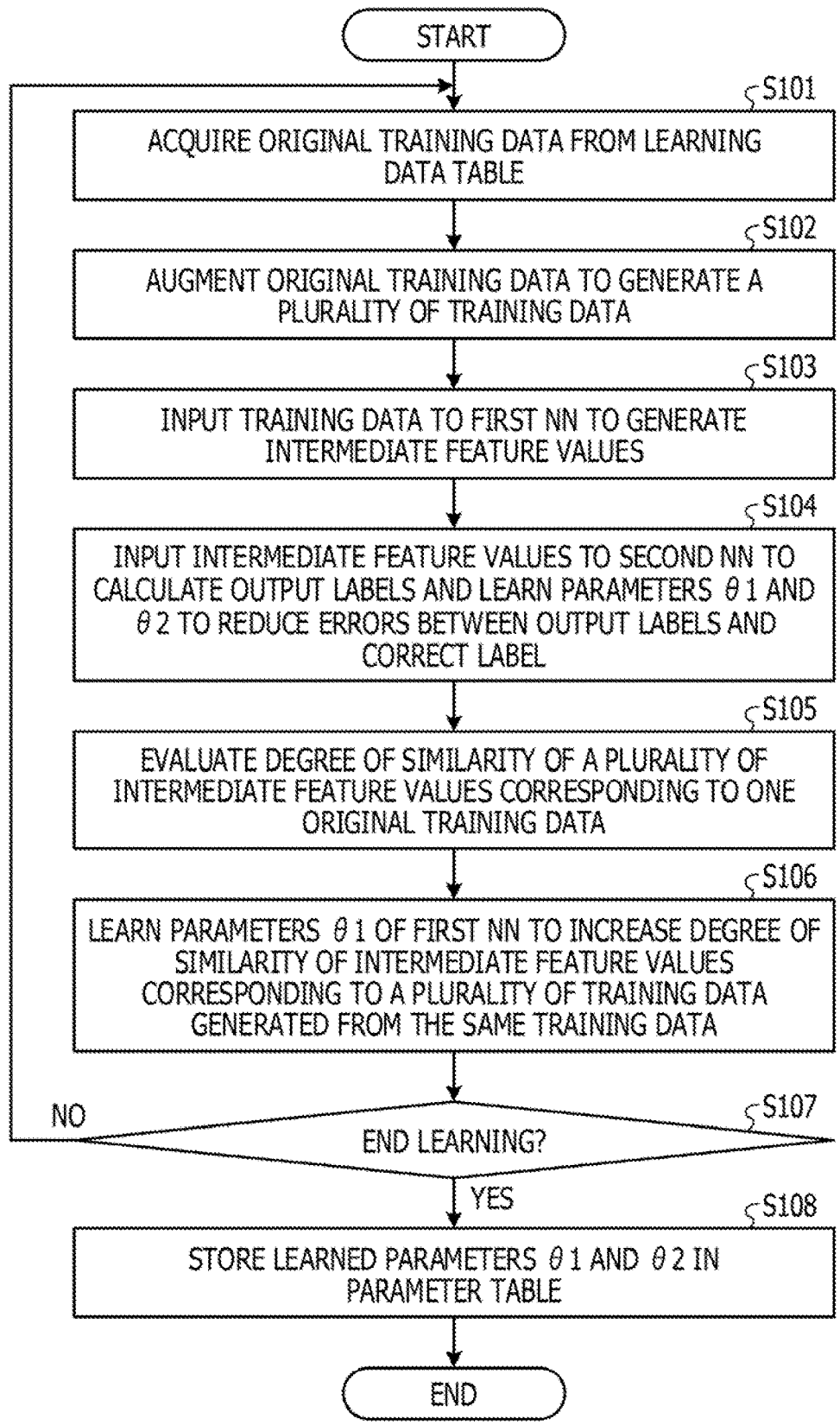
FIG. 9 is a flow chart illustrating a procedure of a learning apparatus according to the first embodiment.

Next, an example of a procedure of the learning apparatus 100 according to the first embodiment will be described. FIG. 9 is a flow chart illustrating a procedure of a learning apparatus according to the first embodiment. As illustrated in FIG. 9, the augmentation unit 150b of the learning apparatus 100 acquires the original training data from the learning data table 140a (step S101).

The augmentation unit 150b augments the original training data to generate a plurality of training data (step S102). The feature value generation unit 150c of the learning apparatus 100 inputs the training data to the first NN to generate intermediate feature values (step S103).

The learning unit 150d of the learning apparatus 100 inputs the intermediate feature values to the second NN to calculate output labels and learns the parameters θ1 and θ2 to reduce errors between the output labels and the correct label (step S104).

The feature value generation unit 150c evaluates the degree of similarity of the plurality of intermediate feature values corresponding to one original training data (step S105). The learning unit 150d learns the parameters θ1 of the first NN to increase the degree of similarity of the intermediate feature values corresponding to the plurality of training data generated from the same training data (step S106).

If the learning apparatus 100 is not to end the learning (step S107, No), the learning apparatus 100 moves to step S101. On the other hand, if the learning apparatus 100 is to end the learning (step S107, Yes), the learning apparatus 100 stores the learned parameters θ1 and θ2 in the parameter table 140c (step S108).

The learning apparatus 100 may display, on the display unit 130, the learned parameters θ1 and θ2 stored in the parameter table 140c or may transmit the information of the parameters θ1 and θ2 to a determination apparatus that uses the parameters θ1 and θ2 to perform various types of determination.

Next, an advantageous effect of the learning apparatus 100 according to the first embodiment will be described. The learning apparatus 100 uses the back propagation method to learn the parameters of the first NN to increase the degree of similarity of the intermediate feature values of the training data augmented from the same training data. As a result, the intermediate feature values of the plurality of training data augmented from the same training data become close to each other. Therefore, the data may be easily separated for each label, and the accuracy of the deep learning using the data augmentation may be improved.

Figure 10:
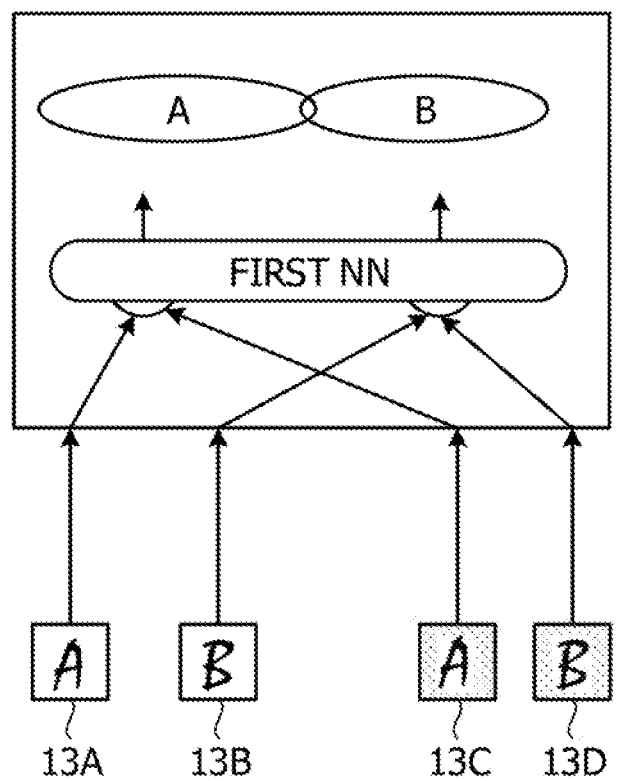
FIG. 10 is a diagram for describing an advantageous effect of a learning apparatus according to the first embodiment.

FIG. 10 is a diagram for describing an advantageous effect of a learning apparatus according to the first embodiment. The data 13A, 13B, 13C, and 13D will be used as the augmented training data to describe the advantageous effect. The data 13A and the data 13C are data of the same label with different features (data obtained by augmenting the same original training data). Once the data 13A and 13C are input to the first NN, the intermediate feature values of the data 13A and 13C are included in the region A. The data 13B and the data 13D are data of the same label with different features. Once the data 13B and 13D are input to the learning device 20, the intermediate feature values of the data 13B and 13D are included in the region B.

In the learning apparatus 100, the parameters of the first NN are learned so that the intermediate feature values of the plurality of training data augmented from the same training data become similar to each other. As a result, the data may be easily separated for each label, and the accuracy of the deep learning using the data augmentation may be improved. Although the region A and the region B partially overlap in the example described in FIG. 23, the region A and the region B hardly overlap and are separated in the example illustrated in FIG. 10.

The learning apparatus 100 obtains the variance of the intermediate feature values of the plurality of training data augmented from the same training data and learns the parameters of the first NN to reduce the variance. As a result, the intermediate feature values of the plurality of training data augmented from the same training data may become similar to each other.

Although the variance is used to learn the parameters of the first NN in the first embodiment, the learning is not limited to this. For example, the feature value generation unit $150c$ of the learning apparatus 100 may learn the parameters of the first NN to reduce difference values of the intermediate feature values of the plurality of training data augmented from the same training data.

Figure 11:
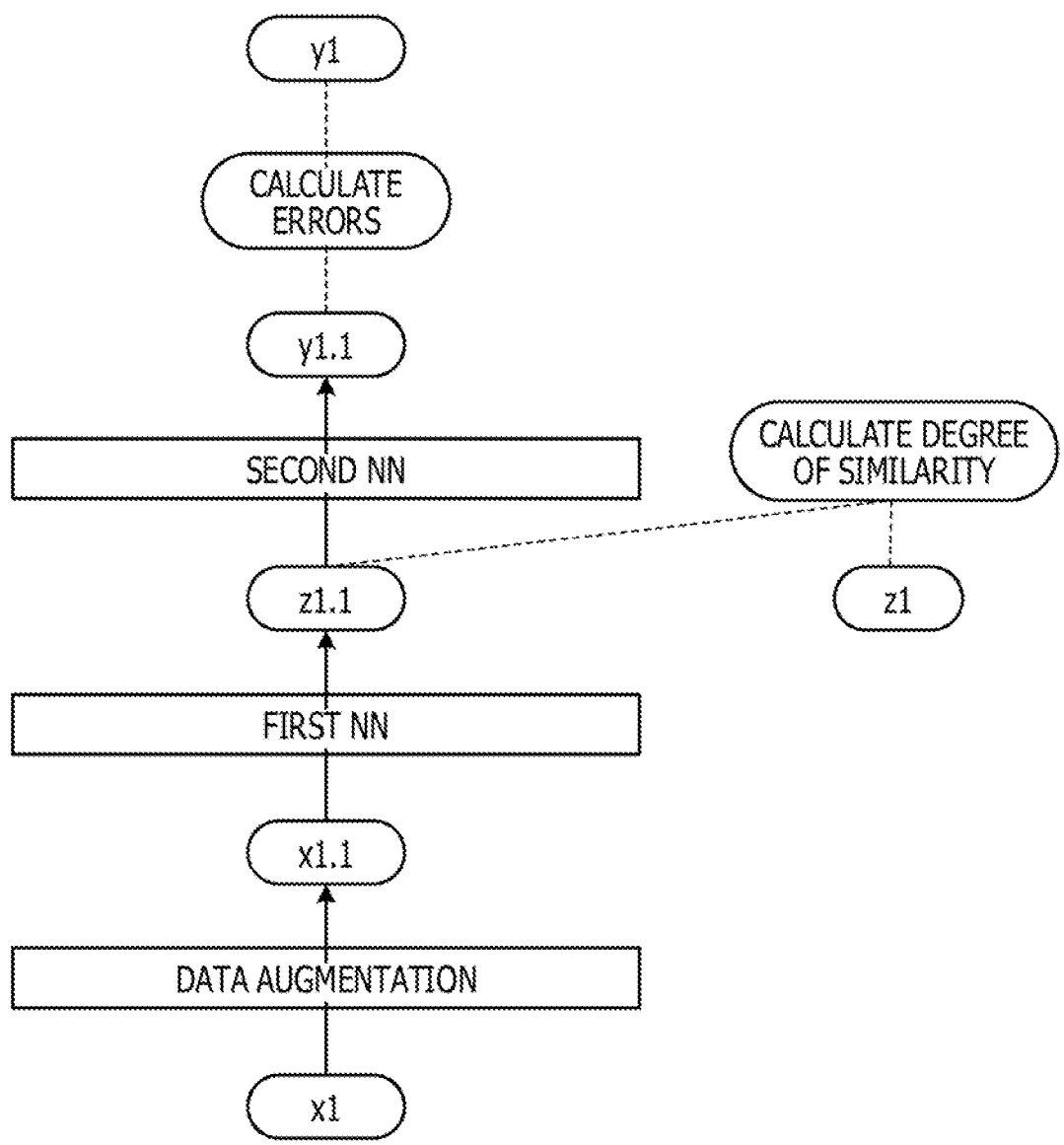
FIG. 11 is a diagram for describing a process of a learning apparatus according to a second embodiment.

FIG. 11 is a diagram for describing a process of a learning apparatus according to a second embodiment. As illustrated in FIG. 11, the learning apparatus augments the original training data x1 to generate the learning data x1.1. The correct label for the training data x1 will be referred to as y1. The learning apparatus also sets a reference feature value z1 corresponding to the training data x1. The value set for the reference feature value varies in each original training data.

The learning apparatus inputs the training data x1.1 to the first NN to calculate the intermediate feature values z1.1. The learning apparatus inputs the intermediate feature values z1.1 to the second NN to calculate the output label y1.1.

The learning apparatus uses the back propagation method to learn the parameters of the first NN and the reference feature value z1 so that the intermediate feature values z1.1 and the reference feature value z1 become similar to each other. The learning apparatus also calculates the error between the output label y1.1 and the correct label y1 and uses the back propagation method to learn the parameters of the first NN and the second NN to reduce the error.

Although not illustrated, the learning apparatus augments the original training data x1 to generate the training data x1.2. The learning apparatus inputs the training data x1.2 to the first NN to calculate the intermediate feature values z1.2 and inputs the intermediate feature values z1.2 to the second NN to calculate the output label y1.2.

The learning apparatus uses the back propagation method to learn the parameters of the first NN and the reference feature value z1 so that the intermediate feature values z1.2 and the reference feature value z1 become similar to each other. The learning apparatus also calculates the error between the output label y1.2 and the correct label y1 and uses the back propagation method to learn the parameters of the first NN and the second NN to reduce the error.

Similarly, the learning apparatus augments the original training data x1 to generate the training data x1.3. The learning apparatus inputs the training data x1.3 to the first NN to calculate the intermediate feature values z1.3 and inputs the intermediate feature values z1.3 to the second NN to calculate the output label y1.3.

The learning apparatus uses the back propagation method to learn the parameters of the first NN and the reference feature value z1 so that the intermediate feature values z1.3 and the reference feature value z1 become similar to each other. The learning apparatus also calculates the error between the output label y1.3 and the correct label y1 and uses the back propagation method to learn the parameters of the first NN and the second NN to reduce the error.

The learning apparatus repeatedly executes the learning to learn the parameters of the first NN so that the intermediate feature values z1.1, z1.2, and z1.3 of the training data x1.1, x1.2, and x1.3 augmented from the same training data x1 become similar to the reference feature value z1. As a result, the intermediate feature values of the plurality of training data augmented from the same training data become close to each other. Therefore, the data may be easily separated for each label, and the accuracy of the deep learning using the data augmentation may be improved.

Figure 12:
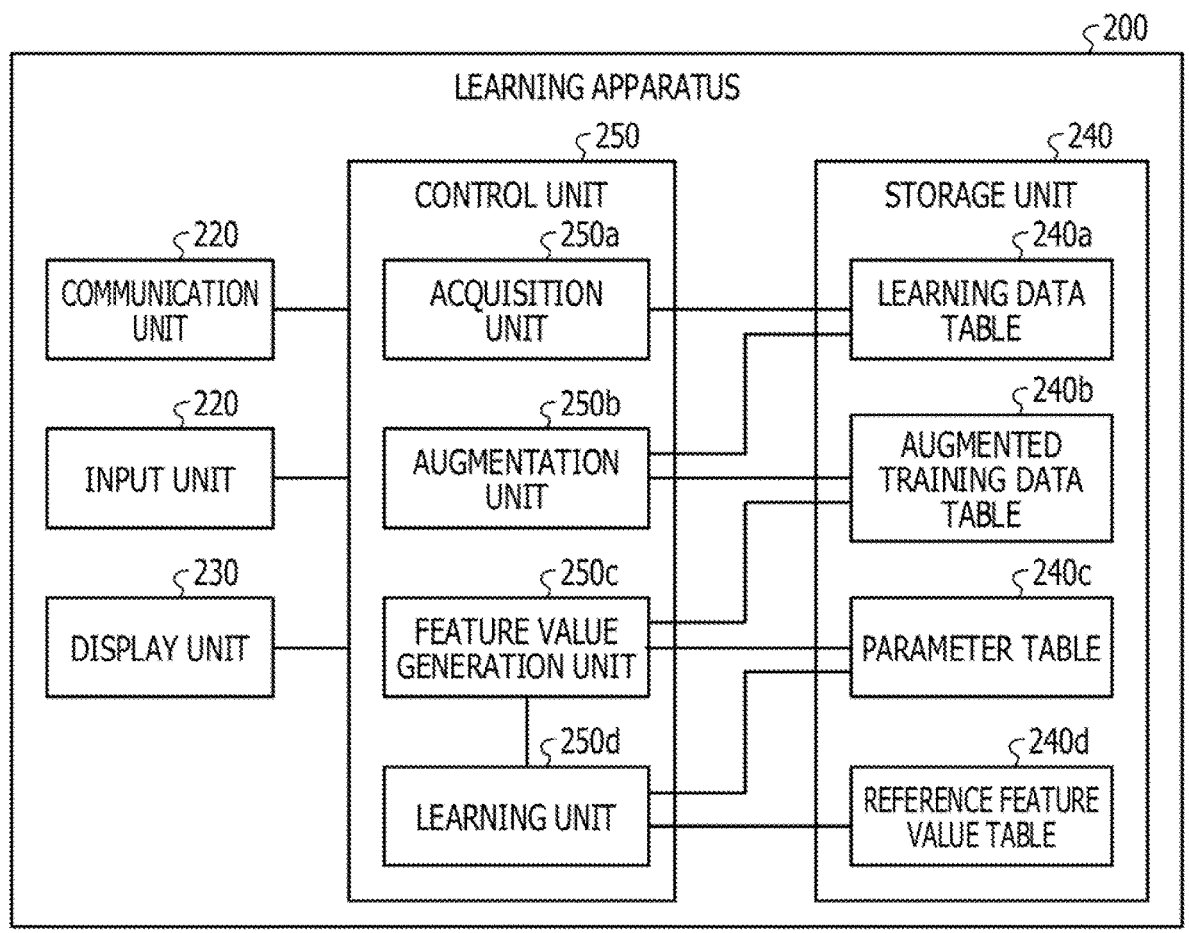
FIG. 12 is a functional block diagram illustrating a configuration of a learning apparatus according to a second embodiment.

Next, an example of a configuration of the learning apparatus according to the second embodiment will be described. FIG. 12 is a functional block diagram illustrating a configuration of a learning apparatus according to the second embodiment. As illustrated in FIG. 12, a learning apparatus 200 includes a communication unit 210, an input unit 220, a display unit 230, a storage unit 240, and a control unit 250.

The communication unit 210 is a processing unit that executes data communication with an external apparatus (not illustrated) through a network or the like. The communication unit 210 corresponds to a communication apparatus. For example, the communication unit 210 receives information of a learning data table $240a$ described later from the external apparatus or the like.

The input unit 220 is an input apparatus that inputs various types of information to the learning apparatus 200. For example, the input unit 220 corresponds to a keyboard, a mouse, a touch panel, or the like.

The display unit 230 is a display apparatus that displays various types of information output from the control unit 250. For example, the display unit 230 corresponds to a liquid crystal display, a touch panel, or the like.

The storage unit 240 includes the learning data table $240a$, an augmented training data table $240b$, a parameter table $240c$, and a reference feature value table $240d$. The storage unit 240 corresponds to a semiconductor memory device, such as a RAM, a ROM, and a flash memory, or a storage apparatus, such as an HDD.

The learning data table 240a is a table holding the original training data. FIG. 13 depicts an example of a data structure of a learning data table according to the second embodiment. As illustrated in FIG. 13, the learning data table 240a associates data numbers, the training data, and the correct labels. The data number is a number for uniquely identifying the original training data. For example, the correct label corresponding to the training data "x1" is "y1," and the data number of the training data "x1" is "001."

The augmented training data table 240b is a table holding the training data augmented based on the original training data. FIG. 14 depicts an example of a data structure of an augmented training data table according to the second embodiment. As illustrated in FIG. 14, the augmented training data table associates data numbers, the augmented training data, and the correct labels. The data number is a number for uniquely identifying the original training data to be augmented. The correct label corresponding to the augmented training data is a correct label associated with the original training data corresponding to the data number.

The parameter table 240c is a table holding the parameters of the first NN and the parameters of the second NN. The data structure of the parameter table 240c is similar to the data structure of the parameter table 140c described in FIG. 3.

The reference feature value table 240d is a table holding the reference feature values set for the original training data. FIG. 15 depicts an example of a data structure of a reference feature value table according to the second embodiment. As illustrated in FIG. 15, the reference feature value table 240d associates data numbers and the reference feature values. The data number is a number for uniquely identifying the original training data. The initial value of the reference feature value is set in advance.

FIG. 12 will be further described. The control unit 250 includes an acquisition unit 250a, an augmentation unit 250b, a feature value generation unit 250c, and a learning unit 250d. The control unit 250 may be realized by a CPU, an MPU, or the like. The control unit 250 may also be realized by hard-wired logic, such as an ASIC and an FPGA.

The acquisition unit 250a is a processing unit that acquires information of the learning data table 240a from an external apparatus or the like. The acquisition unit 250a stores the acquired information of the learning data table 240a in the learning data table 240a.

The augmentation unit 250b is a processing unit that augments (performs data augmentation of) the original training data stored in the learning data table 240a to generate a plurality of training data. The description of the data augmentation performed by the augmentation unit 250b is similar to the description of the data augmentation performed by the augmentation unit 150b.

The augmentation unit 250b associates and stores the augmented training data, the correct labels for the original training data, and the data numbers in the augmented training data table 240b. The augmentation unit 250b repeatedly applies the process to each training data stored in the learning data table 240a.

The feature value generation unit 250c is a processing unit that generates intermediate feature values corresponding to the plurality of augmented training data. The process of the feature value generation unit 150c will be described below.

The feature value generation unit 250c executes the first NN and sets the parameters of the first NN to the parameters θ1 stored in the parameter table 240c. The feature value generation unit 250c acquires the augmented training data and the data number corresponding to the training data from the augmented training data table 240b. The feature value generation unit 150c inputs the augmented training data to the first NN. The feature value generation unit 150c uses the parameters θ1 set for the first NN to calculate the intermediate feature values of the training data.

The feature value generation unit 250c evaluates the degree of similarity of the reference feature value corresponding to the data number and the intermediate feature values. For example, the feature value generation unit 250c calculates square errors between the reference feature value and the intermediate feature values. The feature value generation unit 250c outputs the intermediate feature values, the data number, and the information of the square errors to the learning unit 250d.

The feature value generation unit 250c acquires the augmented training data from the augmented training data table 240b and repeatedly executes the process of calculating the intermediate feature values, the process of calculating the information of the square errors, and the process of outputting the intermediate feature values, the data number, and the information of the square errors to the learning unit 250d.

The learning unit 250d is a processing unit that learns the parameters of the first NN and the second NN. The process of the learning unit 250d will be described below. The learning unit 250d executes the first NN and sets the parameters of the first NN to the parameters θ1 stored in the parameter table 240c. The learning unit 250d also executes the second NN and sets the parameters of the second NN to the parameters θ2 stored in the parameter table 240c.

The learning unit 250d inputs the intermediate feature values acquired from the feature value generation unit 250c to the second NN. The learning unit 250d uses the parameters θ2 set for the second NN to calculate the output labels.

Figure 16:
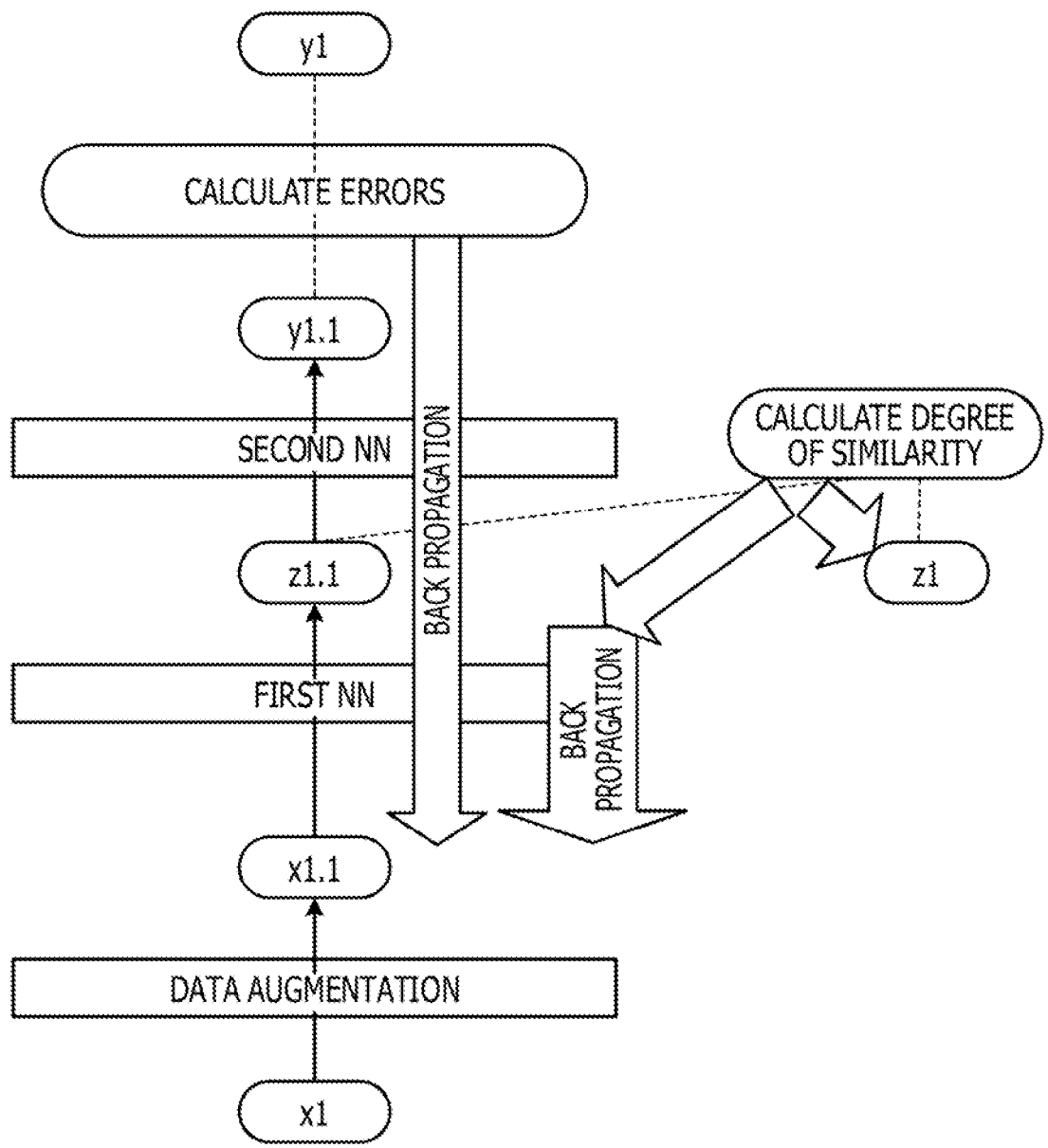
FIG. 16 is a diagram for describing a process of a learning unit according to the second embodiment.

FIG. 16 is a diagram for describing a process of a learning unit according to the second embodiment. For example, the learning unit 250d inputs the intermediate feature values z1.1 to the second NN to calculate the output label y1.1. The learning unit 250d learns the parameters θ1 of the first NN and the parameters θ2 of the second NN based on the back propagation method so that the output label y1.1 and the correct label y1 approach each other. The learning unit 250d also learns the parameters θ1 of the first NN and the reference feature value z1 to reduce the square errors between the intermediate feature values z1.1 and the reference feature value z1. The learning unit 250d repeatedly executes the process every time the learning unit 250d acquires the intermediate feature values, the data number, and the information of the square errors from the feature value generation unit 250c.

The learning unit 250d updates the parameters θ1 and θ2 of the parameter table 240c to the learned parameters θ1 and θ2. The learning unit 250d also updates the reference feature value of the reference feature value table 240d to the learned reference feature value. The reference feature value to be updated is the reference feature value associated with the data number acquired from the feature value generation unit 250c.

For example, the learning unit 250d learns the parameters θ1 and θ2 of the first NN and the second NN and the reference feature value to reduce the errors between the output labels and the correct label and to increase the degree of similarity of the intermediate feature values and the reference feature value.

Figure 17:
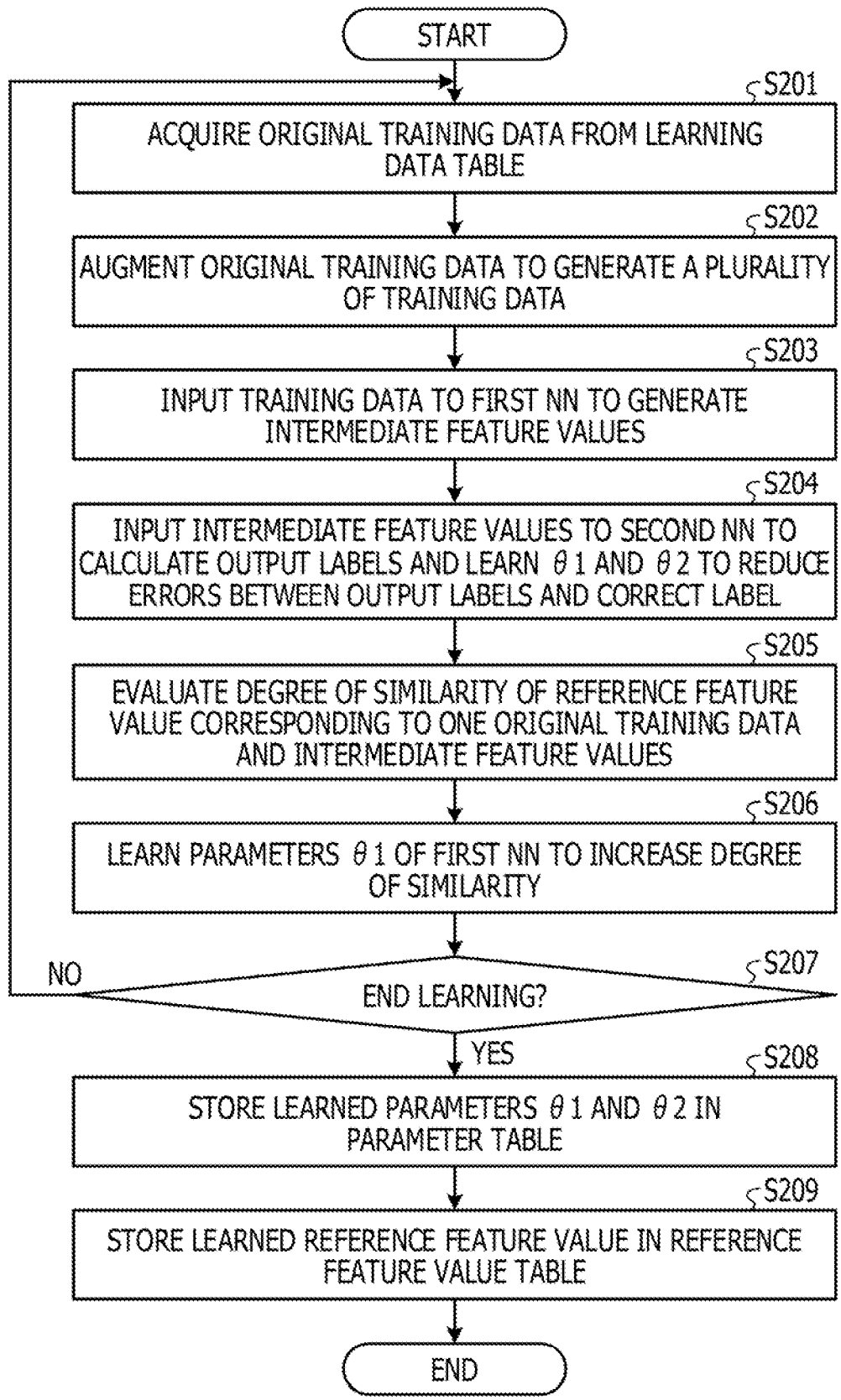
FIG. 17 is a flow chart illustrating a procedure of a learning apparatus according to the second embodiment.

Next, an example of a procedure of the learning apparatus 200 according to the second embodiment will be described. FIG. 17 is a flow chart illustrating a procedure of a learning apparatus according to the second embodiment. As illustrated in FIG. 17, the augmentation unit 250b of the learning apparatus 200 acquires the original training data from the learning data table 240a (step S201).

The augmentation unit 250b augments the original training data to generate a plurality of training data (step S202). The feature value generation unit 250c of the learning apparatus 200 inputs the training data to the first NW to generate intermediate feature values (step S203).

The learning unit 250d inputs the intermediate feature values to the second NN to calculate output labels and learns the parameters θ1 and θ2 to reduce errors between the output labels and the correct label (step S204). The feature value generation unit 250c evaluates the degree of similarity of the reference feature value corresponding to one original training data and the intermediate feature values (step S205).

The learning unit 250d learns the parameters θ1 of the first NN to increase the degree of similarity of the reference feature value and the intermediate feature values (step S206).

If the learning apparatus 200 is not to end the learning (step S207, No), the learning apparatus 200 moves to step S201. On the other hand, if the learning apparatus 200 is to end the learning (step S207, Yes), the learning apparatus 200 stores the learned parameters θ1 and θ2 in the parameter table 240c (step S208). The learning apparatus 200 stores the learned reference feature value in the reference feature value table 240d (step S209).

Note that the learning apparatus 200 may display, on the display unit 230, the learned parameters θ1 and θ2 stored in the parameter table 240c or may transmit the information of the parameters θ1 and θ2 to a determination apparatus that uses the parameters θ1 and θ2 to perform various types of determination.

Next, an advantageous effect of the learning apparatus 200 according to the second embodiment will be described. The learning apparatus 200 learns the parameters of the first NW, the parameters of the second NN, and the reference feature value so that the intermediate feature values of the training data augmented from the same training data become similar to the reference feature value. As a result, the intermediate feature values of the plurality of training data augmented from the same training data become close to each other. Therefore, the data may be easily separated for each label, and accuracy of the deep learning using the data augmentation may be improved.

Although the learning apparatus 200 according to the second embodiment uses the square error as an index of evaluation to learn the parameters and the reference feature value, the learning is not limited to this. For example, the learning apparatus 200 may set a mean p and variance a of the intermediate feature values as reference feature values and may learn the parameters and the reference feature values so that the mean and the variance of the intermediate feature values of the plurality of training data augmented from the same training data approach the reference feature values.

Figure 18:
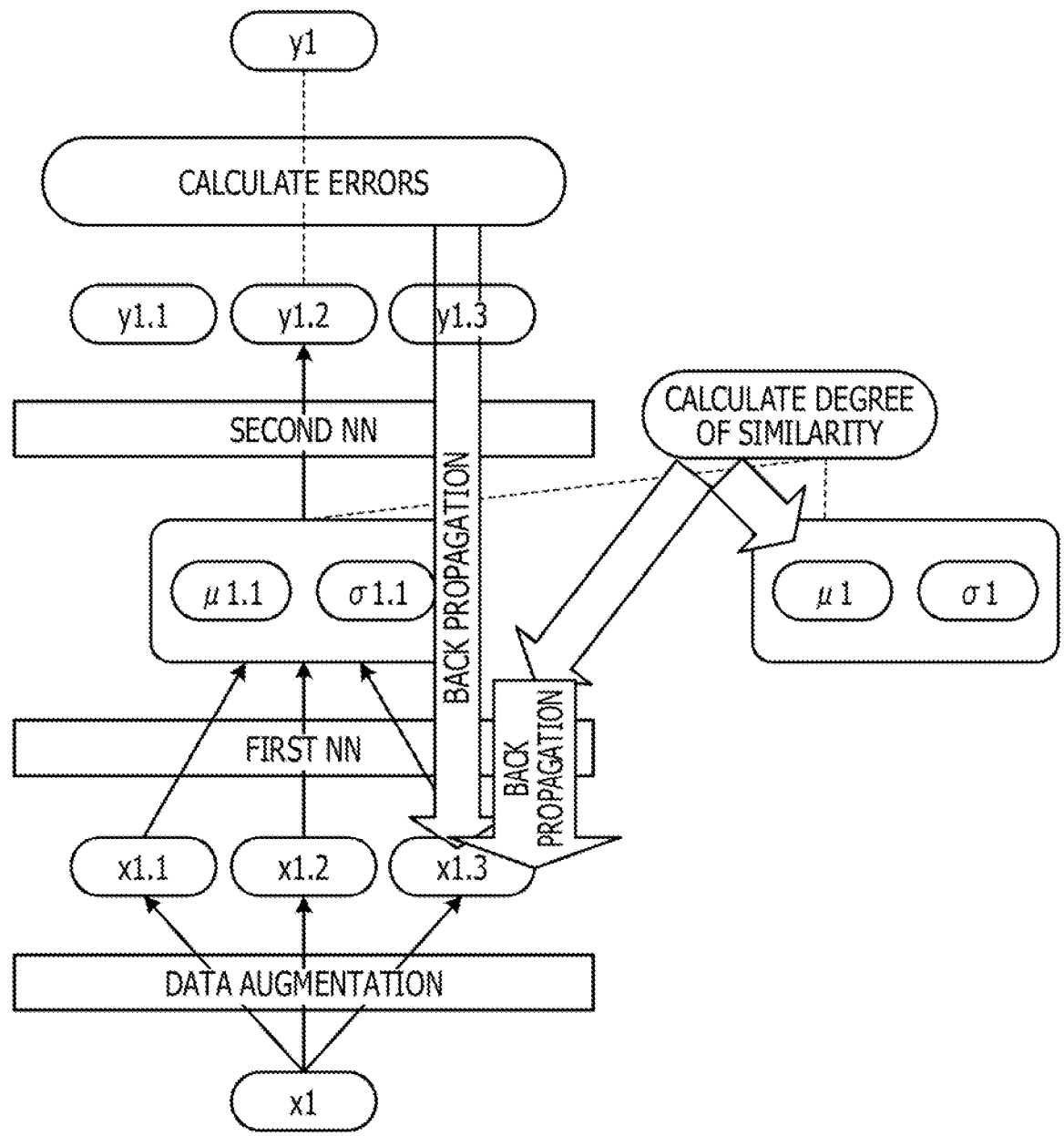
FIG. 18 is a diagram for describing an example of another process of a learning apparatus.

FIG. 18 is a diagram for describing an example of another process of a learning apparatus. For example, the learning apparatus 100 sets reference feature values (mean μ1, variance σ1) corresponding to the original training data x1. The feature value generation unit 250c sequentially inputs the plurality of training data x1.1 to x1.3 augmented from the same training data x1 to the first NN and calculates the intermediate feature values z1.1 to z1.3 (not illustrated) of the training data x1.1 to x1.3, respectively. The feature value generation unit 250c calculates a mean μ1.1 and variance σ1.1 of each of the intermediate feature values z1.1 to z1.3.

The feature value generation unit 250c evaluates the distance between a probability distribution of the reference feature values (mean μ1, variance σ1) and a probability distribution of the reference feature values (mean μ1.1, variance σ1.1) based on Kullback-Leibler (KL) divergence.

The learning unit 250d of the learning apparatus 100 uses the back propagation method to learn the parameters of the first NN and the reference feature values (mean μ1, variance σ1) so that the distance between the probability distributions becomes short. The learning unit 250d also uses the back propagation method to learn the parameters of the first NN and the parameters of the second NN so that the output labels y1.1 to y1.3 approach the correct label y1 when the intermediate feature values z1.1 to z1.3 are input to the second NN.

For example, the learning unit 250d learns the parameters θ1 and θ2 of the first NN and the second NN and the reference feature values to reduce the errors between the output labels and the correct label and to increase the degree of similarity of the intermediate feature values and the reference feature values. As a result, the intermediate feature values of the plurality of training data augmented from the same training data become close to each other. Therefore, the data may be easily separated for each label, and the accuracy of the deep learning using the data augmentation may be improved.

Figure 19:
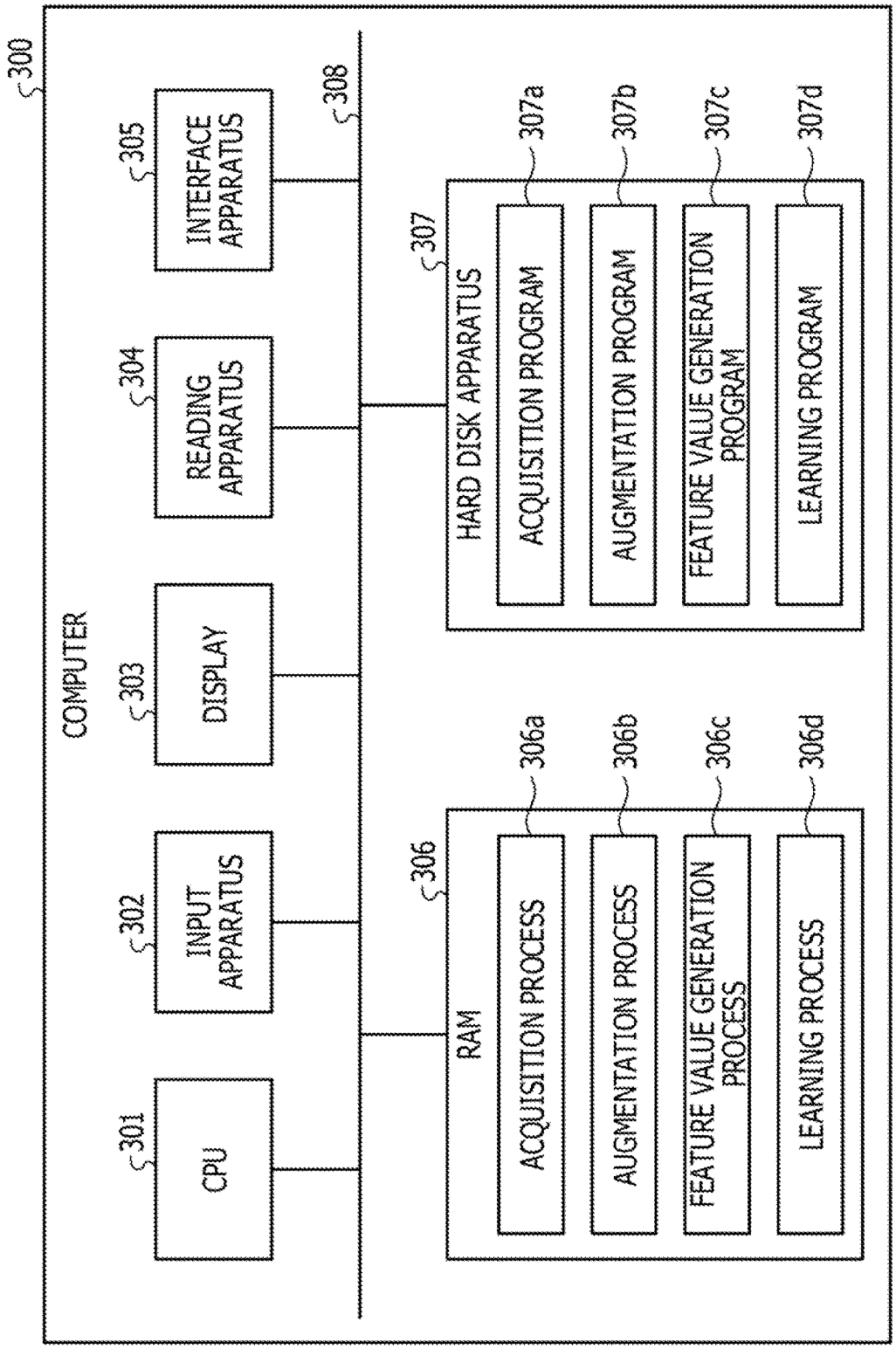
FIG. 19 depicts an example of a hardware configuration of a computer that realizes a function similar to a learning apparatus according to the embodiments.
Figure 20:
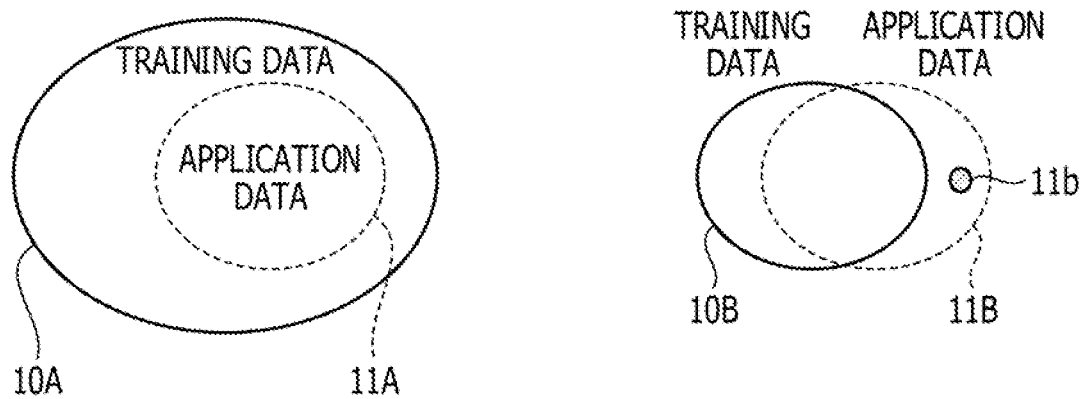
FIG. 20 is a diagram for describing a relationship between training data and application data.
Figure 21:
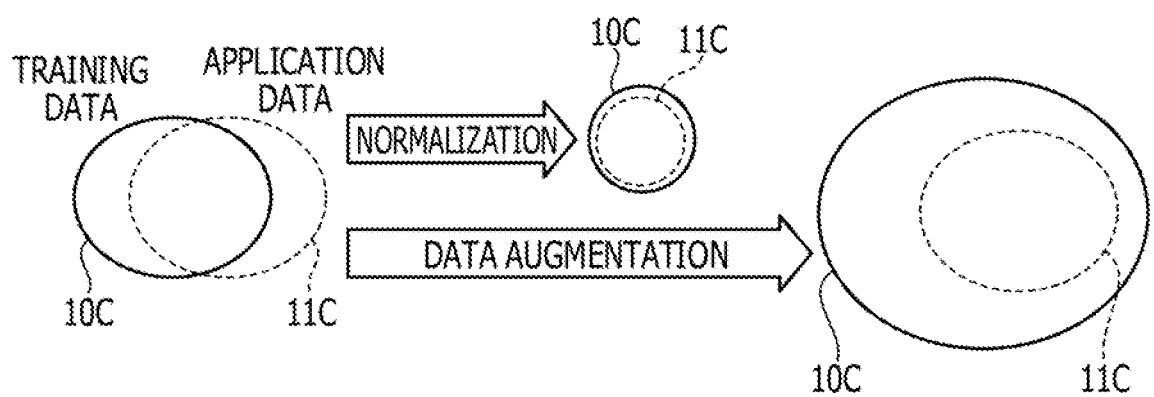
FIG. 21 is a diagram for describing normalization and data augmentation.

Next, an example of a hardware configuration of a computer that realizes a function similar to the learning apparatus 100 (200) illustrated in the embodiment will be described. FIG. 19 depicts an example of a hardware configuration of a computer that realizes a function similar to a learning apparatus according to the present embodiments.

As illustrated in FIG. 19, a computer 300 includes a CPU 301 that executes various types of arithmetic processing, an input apparatus 302 that receives input of data from the user, and a display 303. The computer 300 further includes a reading apparatus 304 that reads a program or the like from a storage medium and an interface apparatus 305 that transfers data to and from an external apparatus or the like through a wired or wireless network. The computer 300 includes a RAM 306 that temporarily stores various types of information and a hard disk apparatus 307. The apparatuses 301 to 307 are coupled to a bus 308.

The hard disk apparatus 307 includes an acquisition program 307a, an augmentation program 307b, a feature value generation program 307c, and a learning program 307d. The CPU 301 reads and expands the acquisition program 307a, the augmentation program 307b, the feature value generation program 307c, and the learning program 307d on the RAM 306.

The acquisition program 307a functions as an acquisition process 306a. The augmentation program 307b functions as an augmentation process 306b. The feature value generation program 307c functions as a feature value generation process 306c, The learning program 307d functions as a learning process 306d.

The process of the acquisition process 306a corresponds to the processes of the acquisition units 150a and 250a. The process of the augmentation process 306b corresponds to the processes of the augmentation units 150b and 250b. The process of the feature value generation process 306c corresponds to the processes of the feature value generation units 150c and 250c. The process of the learning process 306d corresponds to the processes of the learning units 150d and 250d.

The programs 307a to 307d may not be stored in the hard disk apparatus 307 from the beginning. For example, the programs may be stored in a "portable physical medium," such as a flexible disk (FD), a compact disc (CD)-ROM, a digital versatile disc (DVD), a magneto-optical disk, and an integrated circuit (IC) card, inserted into the computer 300. The computer 300 may then read and execute the programs 307a to 307d.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning method executed by a computer, the learning method comprising:
    obtaining a first training data set and a second training data set, the first training data set including a plurality of first augmented training data each of which is generated by augmenting first original training data, the second training data set including a plurality of second augmented training data each of which is generated by augmenting second original training data; and
    training parameters of a machine learning model by inputting each of the first training data set and the second training data set, to the machine learning model, the training of the parameters including
        in response to the inputting of the first training data set to the machine learning model, causing the machine learning model to train the parameters of the machine learning model so that first intermediate feature values, which are calculated by the machine learning model from the first training data set, become similar to each other, and
        in response to the inputting of the second training data set to the machine learning model, causing the machine learning model to train the parameters of the machine learning model so that second intermediate feature values, which are calculated by the machine learning model from the second training data set, become similar to each other and become different from each of the first intermediate feature values.

2. The learning method according to claim 1, wherein the training of the parameters of the machine learning model includes:
    in response to the inputting of each of the first training data set and the second training data set to the machine learning model, causing the machine learning model to calculate variance of the intermediate feature values output from a lower layer of the machine learning model, and to train the parameters of the machine learning model to reduce the variance.

3. The learning method according to claim 1, wherein the training of the parameters of the machine learning model includes:
    in response to the inputting of the first training data set to the machine learning model, causing the machine learning model to train the parameters of the machine learning model and a first reference feature value, the first reference feature value corresponding to the first original training data, so that the first intermediate feature values output from a lower layer of the machine learning model and the first reference feature value become similar to each other; and
    in response to the inputting of the second training data set to the machine learning model, causing the machine learning model to train the parameters of the machine learning model and a second reference feature value, the second reference feature value corresponding to the second original training data, so that the second intermediate feature values output from a lower layer of the machine learning model and the second reference feature value become similar to each other.

4. The learning method according to claim 1, wherein the training of the parameters of the machine learning model includes:
    in response to the inputting of the first training data set to the machine learning model, causing the machine learning model to train the parameters of the machine learning model and a first reference feature value, the first reference feature value corresponding to the first original training data, so that a distribution of the first intermediate feature values output from a lower layer of the machine learning model and the first reference feature value become similar to each other; and
    in response to the inputting of the second training data set to the machine learning model, causing the machine learning model to train the parameters of the machine learning model and a second reference feature value, the second reference feature value corresponding to the second original training data, so that a distribution of the second intermediate feature values output from a lower layer of the machine learning model and the second reference feature value become similar to each other.

5. A learning apparatus comprising:
    a memory; and
    a processor coupled to the memory, the processor configured to:
        obtain a first training data set and a second training data set, the first training data set including a plurality of first augmented training data each of which is generated by augmenting first original training data, the second training data set including a plurality of second augmented training data each of which is generated by augmenting second original training data; and
        train parameters of a machine learning model by inputting each of the first training data set and the second training data set to the machine learning model, the training of the parameters including
            in response to the inputting of the first training data set to the machine learning model, causing the machine learning model to train the parameters of the machine learning model so that first intermediate feature values, which are calculated by the machine learning model from the first training data set, become similar to each other, and
            in response to the inputting of the second training data set to the machine learning model, causing the machine learning model to train the parameters of the machine learning model so that second intermediate feature values, which are calculated by the machine learning model from the second training data set, become similar to each other and become different from each of the first intermediate feature values.

6. A non-transitory computer-readable recording medium having stored therein a program that causes a computer to execute a learning process, the learning process comprising:

obtaining a first training data set and a second training data set, the first training data set including a plurality of first augmented training data each of which is generated by augmenting first original training data, the second training data set including a plurality of second augmented training data each of which is generated by augmenting second original training data; and training parameters of a machine learning model by inputting each of the first training data set and the second training data set to the machine learning model, the training of the parameters including in response to the inputting of the first training data set to the machine learning model, causing the machine learning model to train the parameters of the machine learning model so that first intermediate feature values, which are calculated by the machine learning model from the first training data set, become similar to each other, and in response to the inputting of the second training data set to the machine learning model, causing the machine learning model to train the parameters of the machine learning model so that second intermediate feature values, which are calculated by the machine learning model from the second training data set, become similar to each other and become different from each of the first intermediate feature values.

* * * * *